United States Patent
Humfeldt et al.

(10) Patent No.: US 7,527,221 B2
(45) Date of Patent: May 5, 2009

(54) MOUNTING DEVICE FOR INTERIOR EQUIPMENT IN AIRCRAFT

(75) Inventors: Dirk Humfeldt, Hamburg (DE); Michael Harriehausen, Hamburg (DE); Jan Schroeder, Hamburg (DE); Martin Sperber, Moenchengladbach (DE); Michael Demary, Meckenheim (DE)

(73) Assignee: Airbus Deutschland GmbH (DE)

( * ) Notice: Subject to any disclaimer, the term of this patent is extended or adjusted under 35 U.S.C. 154(b) by 412 days.

(21) Appl. No.: 11/215,630

(22) Filed: Aug. 30, 2005

(65) Prior Publication Data

US 2006/0086886 A1 Apr. 27, 2006

Related U.S. Application Data

(60) Provisional application No. 60/627,522, filed on Nov. 12, 2004.

(30) Foreign Application Priority Data

Aug. 31, 2004 (DE) .................. 10 2004 042 080

(51) Int. Cl.
*B64D 11/00* (2006.01)
(52) U.S. Cl. .................... 244/118.5; 248/560
(58) Field of Classification Search ............. 244/118.5; 312/131–134, 245, 301, 317.1, 349, 350, 312/246–247, 273; 248/560, 566, 610, 612; 211/31
See application file for complete search history.

(56) References Cited

U.S. PATENT DOCUMENTS

| 1,380,856 | A | * | 6/1921 | Wallerstein ................. 312/133 |
| 2,494,985 | A | | 1/1950 | Campbell |
| 3,377,044 | A | | 4/1968 | Jackson et al. |
| 3,721,484 | A | * | 3/1973 | Macioge et al. ............. 312/245 |
| 3,938,627 | A | | 2/1976 | Nagazumi et al. |
| 3,968,863 | A | | 7/1976 | Reilly |
| 4,178,032 | A | | 12/1979 | Hone |
| 5,108,048 | A | * | 4/1992 | Chang ..................... 244/118.1 |
| 5,201,481 | A | | 4/1993 | Hararat-Tehrani |
| 5,513,908 | A | * | 5/1996 | Williams ................. 312/140.1 |
| 5,549,258 | A | * | 8/1996 | Hart et al. ................ 244/118.1 |
| 5,839,694 | A | * | 11/1998 | Bargull et al. ............ 244/118.1 |
| 5,938,149 | A | | 8/1999 | Terwesten |
| 6,007,024 | A | | 12/1999 | Stephan |

(Continued)

FOREIGN PATENT DOCUMENTS

DE 382 72 81 A1 2/1990

(Continued)

OTHER PUBLICATIONS

European Office Action dated Apr. 8, 2008.

*Primary Examiner*—Tien Dinh
(74) *Attorney, Agent, or Firm*—Lerner, David, Littenberg, Krumholz & Mentlik, LLP

(57) ABSTRACT

A mounting device for aircraft comprises an energy absorber and wherein the mounting device is mounted between a primary structure of the aircraft and the interior equipment. In this way the load acting on an interior equipment connected to the primary structure of the aircraft by way of the mounting device can be limited if a crash impulse occurs. The load acting on the primary structure is also limited, which can result in enhanced passive safety for the passengers and in weight reduction.

3 Claims, 6 Drawing Sheets

U.S. PATENT DOCUMENTS

| | | | |
|---|---|---|---|
| 6,062,509 A * | 5/2000 | Burrows et al. | 244/118.5 |
| 6,886,779 B2 | 5/2005 | Bansemir et al. | |
| 2003/0111310 A1 | 6/2003 | Renton et al. | |
| 2005/0040287 A1 | 2/2005 | Stephan et al. | |

FOREIGN PATENT DOCUMENTS

| | | |
|---|---|---|
| DE | 196 33 469 C1 | 9/1997 |
| DE | 102 49 517 A1 | 6/2004 |
| EP | 0 490 081 | 6/1992 |
| EP | 1 197 429 A2 | 4/2002 |
| EP | 0 767 100 B1 | 9/2002 |
| WO | WO-03/031260 | 4/2003 |

* cited by examiner

MOUNTING DEVICE FOR INTERIOR EQUIPMENT IN AIRCRAFT

CROSS-REFERENCE TO RELATED APPLICATIONS

This application claims the benefit of the filing date of U.S. Provisional Patent Application No. 60/627,522 filed Nov. 12, 2004, the disclosure of which is hereby incorporated herein by reference.

BACKGROUND OF THE INVENTION

The present invention relates to mounting devices or fastening elements for aircraft. In particular the present invention relates to a mounting device for interior equipments or for an interior equipments element of an aircraft, to a mounting system for interior equipment of an aircraft, and to an aircraft comprising a corresponding mounting device.

In aircraft, mounting devices or fastening elements are used for mounting and fastening interior equipments such as for example ceiling cladding, overhead bins or monuments However, in the case of rigid fastening elements it is often a disadvantage, in particular in the case of strong acceleration, as can occur during severe turbulence or for example also during an emergency landing, that the resulting acceleration forces are directly transferred from the primary structure of the aircraft by way of the mounting device to the fastened interior equipment. Likewise, all forces or acceleration experienced on the interior equipment are transferred to the aircraft structure directly by way of the mounting device or the mounting device system.

Known mounting devices and the interior equipments fastened thereto are statically designed on the basis of calculations relating to static loads or maximum loads. Failure of the mounting, such as can occur for example by its breaking away from the interior equipment as a result of excessive acceleration forces, leads to damage to the mounting, the interior equipments or the primary structure of the aircraft and further can also endanger or injure the passengers or can lead to impediments to any evacuation.

There may be a need to provide a mounting device, in particular for aircraft, which permits safe fastening of interior equipments even under severe mechanical load.

SUMMARY OF THE INVENTION

According to an exemplary embodiment of the present invention the above need may be met by means of a mounting device for interior equipments in an aircraft, which mounting device comprises an energy absorber, wherein the mounting device is attached between the primary structure of the aircraft and the interior equipments.

The energy absorber, which is integrated in the mounting device, may advantageously limits the mechanical load to the interior equipments, which can for example be an overhead bin in the cabin. For example, the energy absorber may be designed to absorb acceleration energy resulting from the movement of the aircraft. By absorption of acceleration energies the load transmission from the primary structure of the aircraft to the interior equipments, or from the interior equipments to the primary structure of the aircraft may be minimised so that mechanical loads on the various structures are reduced. Advantageously this may result in enhanced passive safety in the cabin. Furthermore, by using the mounting device with an energy absorber, according to the invention, the interior equipments may be designed to save material or weight because the maximum occurring mechanical loads may be reduced.

Thus, with the mounting device according to the invention, crash impulses as can occur during an emergency landing may at least partly be absorbed. The resulting impulse may be therefore not completely transmitted to the interior equipments but instead may be dampened or partly absorbed so that further damage may be prevented.

According to a further exemplary embodiment of the present invention the mounting device further comprises a housing, wherein the housing comprises an interior surface. In this arrangement the energy absorber is at least partly arranged in the housing, and absorption of acceleration energy takes place by elastic or plastic deformation of the energy absorber, or by friction between the energy absorber and the housing interior surface.

By absorption of the acceleration energy as a result of plastic deformation of the energy absorber or as a result of friction between the energy absorber and the housing interior surface, advantageously a simple and effective mounting device concept may be provided which may effectively reduces force peaks that can for example occur as a result of violent shaking.

In particular, plastically deformable energy absorbers may be simple and economical to produce and may provide a high degree of reliability and effectiveness.

According to a further exemplary embodiment of the present invention the mounting device further comprises a first and a second fastening region. In this arrangement the first fastening region is designed for fastening the mounting device to the primary structure, and the second fastening region for fastening the mounting device to the interior equipment.

Advantageously, the fastening regions for example may facilitate easy installation. To this effect the mounting device may first be firmly attached to a covering surface or ceiling surface or to a carrier element of the primary structure. After this, an interior equipment element may be permanently connected to the second fastening region by means of the mounting device.

According to a further exemplary embodiment of the present invention the mounting device is fastened to the primary structure or to the interior equipment by a screw, rivet or a self-locking plug-in pin.

Advantageously, in this way it may be possible to provide a mounting device which is easy to install. To this effect the first fastening region may for example in addition comprise a profile, for example in the form of a claw element, which may be plugged on a rectangular section of a mounting device. In this arrangement the claw element may for example be designed such that as a result of this plugging-on, the mounting device may be already mounted on the carrier in such a way that the mounting device's own weight may be held. For final fastening of the mounting device, said mounting device may then be attached to the carrier by means of the screw, rivet or self-locking plug-in pin, or by similar means.

According to a further exemplary embodiment of the present invention the interior equipment is an overhead bin. Advantageously it may thus be ensured that in the case of an emergency landing the overhead bins in the passenger cabins do not tear from their anchor points on the primary structure or secondary structure. Accidents and injuries may be thus effectively prevented.

According to a further exemplary embodiment of the present invention the mounting device further comprises an adjustment element, wherein a frictional strength or the adhesive strength between the energy absorber and the housing interior surface can be adjusted by way of the adjustment element.

According to a further exemplary embodiment of the present invention the mounting device has an energy absorption direction, wherein energy absorption by the energy absorber only occurs if a minimum force, which acts in the direction of the energy absorption direction, is exceeded.

Advantageously, the interior equipments may, in case of correspondingly light loading, thus be held so as to be largely rigid so that said fittings may be suitable for normal on-board operation. In the case of increased loads, such as for example those experienced during a force impulse, advantageously absorption may take place, for example in that the energy absorber is pulled out of the housing in the direction of energy absorption. Thus, correspondingly, force impulses may be effectively intercepted.

According to a further exemplary embodiment of the present invention a mounting system for interior equipments in an aircraft is provided, which mounting system comprises a first mounting device a linear guide, and a bearing. In this arrangement the first mounting device has a first direction of energy absorption, and the linear guide has a guide direction. In this arrangement the guide direction has a component which is parallel to the energy absorption direction of the first mounting device, and the interior equipment is slidably held on the linear guide by means of the bearing. This system may require a movable guide (which in the present embodiment is for example a linear guide. In a case where the energy absorber works in forward direction, the Z-absorbers/mountings may follow the movement/position change. In the case of the Z-absorbers, the X-absorbers may move in a circular path (non-absorbing, i.e. non-extending), and thus also change the Z-absorbers in their mounting device position on the structural side).

Advantageously, a mounting system may be thus provided which may intercept or absorb an impulse along a guide direction. Advantageously, the guide direction may be aligned along the direction in which force impulses predominantly may occur. When such a force impulse occurs, according to the invention absorption of the energy of the impulse in the direction of the guide direction may take place, wherein, during energy absorption, the interior equipment may move along the linear guide.

According to a further embodiment of the present invention the mounting system further comprises a second mounting device, wherein the second mounting device has a second energy absorption direction, and the guide direction has a component which is perpendicular to the second energy absorption direction. Moreover, the first fastening region of the second mounting device is fastened to the bearing.

Advantageously, it may be thus possible to absorb or intercept crash impulses that not only have a component along the guide direction, but also a component perpendicular to the guide direction. In this arrangement the component along the guide direction may be absorbed by the energy absorber of the first mounting device, and the component perpendicular to the guide direction may be absorbed by the energy absorber of the second mounting device. This may make it possible to provide an impulse-specific design of the energy absorbers for individual directions.

Further objectives, embodiments and advantages of the invention may be stated in the dependent claims and in the further independent claim.

BRIEF DESCRIPTION OF THE DRAWINGS

Below, the invention is described in more detail by means of exemplary embodiments with reference to the drawings.

DETAILED DESCRIPTION

In the following description of the figures, the same reference signs are used for identical or similar elements.

Figure 1:
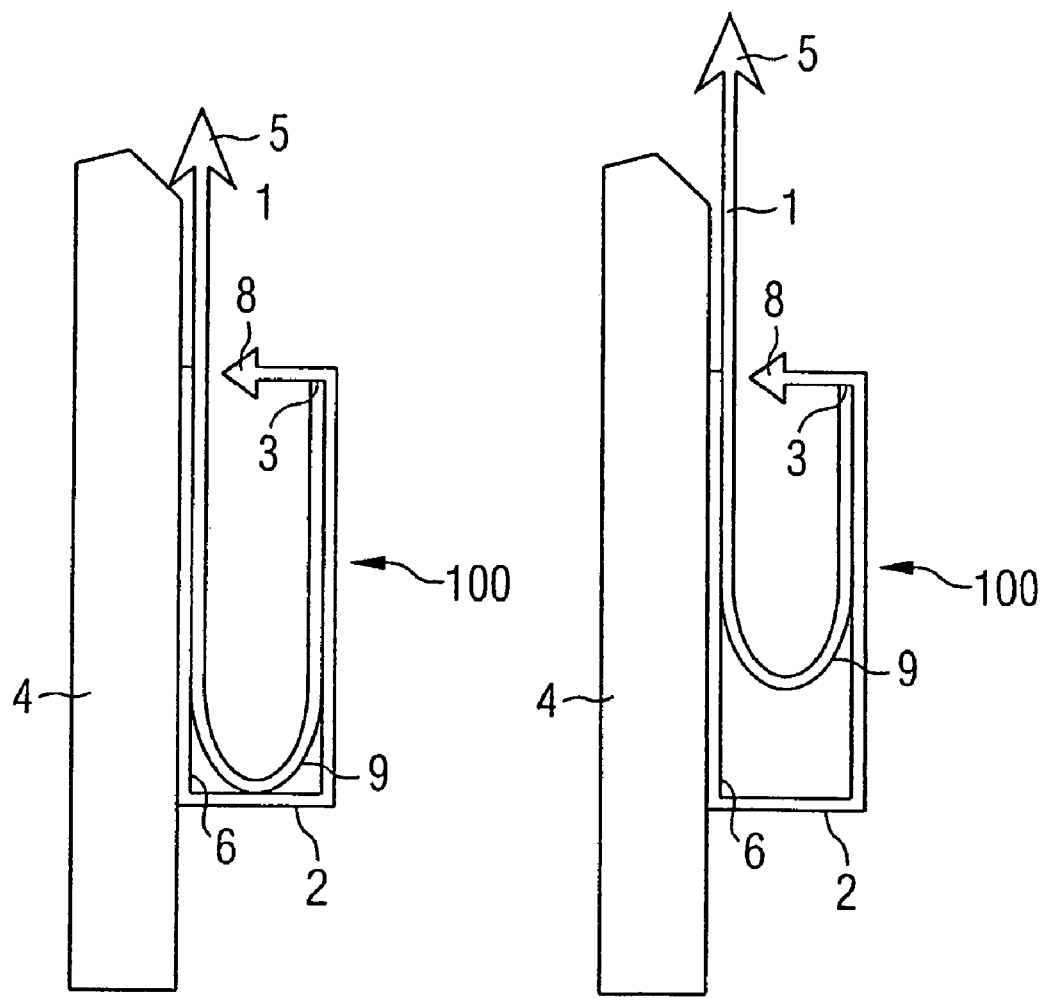
FIG. 1 shows a diagrammatic view of a mounting device according to one embodiment of the present invention, in the initial state and after partial extension.

FIG. 1 shows a diagrammatic view of a mounting device in the initial state and after partial extension according to an embodiment of the present invention. As shown in FIG. 1, the mounting device 100 comprises an energy absorber 1 and a housing 2. The energy absorber 1 is at least partly arranged within the housing 2 and fastened with one of its ends 3 to the inside of the housing. The housing 2 is securely connected to an interior equipment 4, which can for example be a compartment in the cabin which is arranged overhead of the passengers (or vice-versa). This connection takes place for example by means of a screw, a rivet or a self-locking plug-in pin. However, other types of connection, for example gluing or integration in the interior equipment during production, are also imaginable.

Attaching the mounting device 100 to the interior fitting 4 takes place for example in a fastening region 6 which forms part of the housing 2. To simplify installation, the mounting device 100 can for example be fastened to the interior equipment at the time the interior equipment is produced. Subsequently, at the time of installation of the interior equipment 4 in the aircraft, the fastening region 5 of the energy absorber 1 is securely connected to a supporting structure of the aircraft (primary structure or secondary structure). This connection, too, can for example be made by means of a screw, a rivet or a self-locking plug-in pin. Of course, here too, other types of connection are imaginable, for example a glued or squeeze-type connection.

From accidents involving commercial aircraft it is known that even in modern passenger aircraft the overhead bins or overhead stowage compartments, which have been mounted to the primary structure with the use of known mounting devices or mountings, can open up under load, or can even completely pull away from the primary structure. This entails a high risk of injury to passengers.

To prevent acceleration forces resulting from an accident or from relatively violent shaking (acceleration), as for example is sometimes experienced during turbulence or in crash landings, from being transmitted one-to-one from the primary structure or the secondary structure to the interior equipments (or vice-versa), the mounting device 100 according to the invention comprises a corresponding energy absorber 1 which is attached between the primary structure or the secondary structure of the aircraft and its interior equipments 4. In this arrangement the energy absorber 1 is used for absorbing acceleration energy resulting from the movement of the aircraft. In this arrangement the energy absorber 1 is at least partly integrated in the housing 2. In order to absorb the acceleration energy, a travel path is provided. To this effect, as is shown in particular also in FIGS. 6 and 7, a travel path in the corresponding directions can be ensured.

Figure 2:
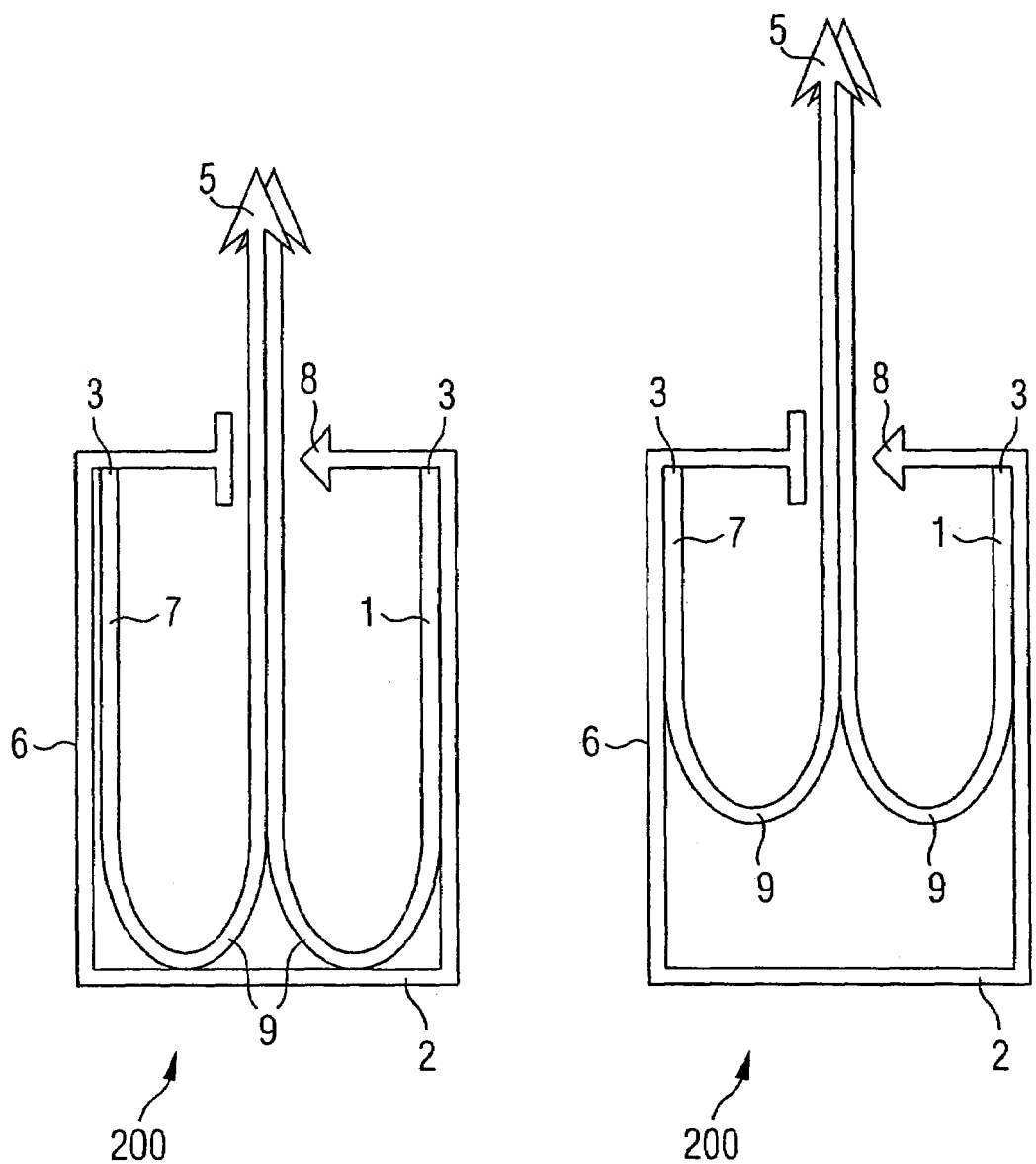
FIG. 2 shows a diagrammatic view of a mounting device according to another embodiment of the present invention, in the initial state and following partial extension.

The function of the energy absorber 1 is for example based on forming a metal strip, such as a steel sheet or a steel strip which is guided in a cage 2. In this arrangement absorption of the acceleration energy or of the acceleration impulse is carried out by plastic deformation or by friction against the cage wall in the interior of the housing 2. (In the so-called double-deck design, as shown in FIG. 2, there is no friction because there are no positions in which there is a relative movement between the energy absorber 1 and the cage 2. In the single-deck design (see FIG. 1) there is friction between the energy absorber and one external wall of the cage). In this arrangement the fastening region 5 is securely connected to the primary structure of the aircraft so that a force impulse emanating from the primary structure is introduced to the energy absorber 1. Provided it exceeds a certain intensity and it has a corresponding direction, this force impulse can then cause the energy absorber 1 to be pulled out of the housing 2.

For example, in order to increase the frictional strength, the energy absorber 1 can be pressed to the inside of the housing 2 by way of the adjustment element 8 so that a corresponding adhesive strength or frictional strength between the energy absorber 1 and the inside of the housing 2 is adjustable.

Of course it is also possible to do without the adjustment element 8, for example if the force necessary for deformation of the energy absorber 1 is sufficient to absorb or adequately reduce the energy.

Of course the fastening region 5 can also be connected to the interior equipment 4. In this case the other fastening region 6 is then connected to the primary structure.

By pulling the energy absorber 1 from the housing 2, the energy absorber 1 is correspondingly deformed. To this effect a corresponding force has to be applied.

The left-hand part of FIG. 1 shows the initial state of a mounting device 100 according to the invention. The right-hand part of FIG. 1 shows the state of a mounting device 100 according to the invention after partial extension of the energy absorber 1 out of the housing 2.

By pulling the absorber 1 from the housing 2, energy absorption takes place. If rebounding, i.e. a repeated force impulse, occurs (this time in the opposite direction), the sheet metal strip 1 is pushed back into the housing 2 (again by absorbing energy). The mounting device 100 according to the invention is thus also able to cope with multiple impulses.

Of course, the mounting device can also be used in cargo holds, e.g. as a fastening device for containers.

FIG. 2 shows a diagrammatic view of a mounting device 200 according to another embodiment of the present invention. The left-hand region of FIG. 2 again shows the initial state of the mounting device 200, and the right-hand region of FIG. 2 shows the state of the mounting device 200 after partial extension. In this arrangement the mounting device 200 comprises two different energy absorbers 1, 7, which partially nestle to each other. This is a type of double-deck structure that can be used for substantial forces. Its function is at least partly based on the same principle as that of the mounting device of FIG. 1. In this embodiment too, for example, the adhesive strength or frictional strength can be adjusted by way of the adjustment element 8 by way of which the energy absorber 7 is then pressed against the housing 2.

Of course it is also possible to do without utilising an adhesive strength or frictional strength, for example if the retaining force generated by the two energy absorbers 1, 7, due to their plastic or elastic properties, is sufficient. In this case non-friction absorption or reduction of energy takes place by pure roll-bending. Energy absorption then takes place by a change in the geometric shape (radius, width, thickness) of the absorber, or by a change in the materials parameters or by control of the force-travel behaviour.

Figure 3:
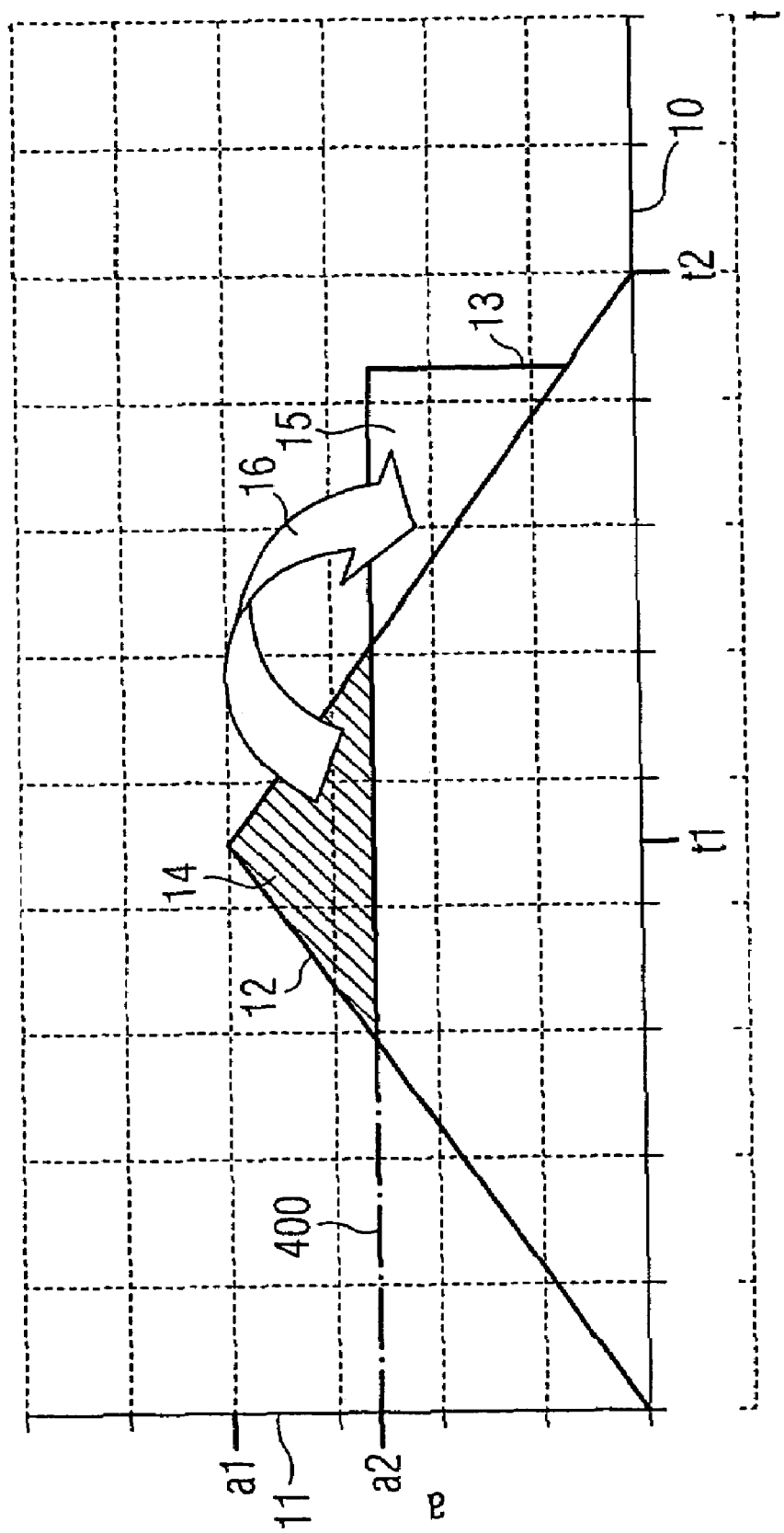
FIG. 3 shows a diagrammatic view of an example of progression over time of a delay impulse of an aircraft on the primary or secondary structure (12) and on the interior equipment (13) acceleration during a crash landing.

FIG. 3 shows a diagrammatic view of an example of a possible progression over time of acceleration in an aircraft. This is a simplified view of a dynamic impulse as can for example occur during an emergency landing. Of course, many other temporal acceleration curves are also possible.

The horizontal axis 10 shows the duration of time, while the vertical axis 11 shows the acceleration that occurs at the respective point in time.

From the point in time 0 to the point in time $t_1$ the progression of the acceleration is linear, and rises during this period from 0 to the value $a_1$. After this acceleration, which under certain circumstances can be extremely high, the acceleration drops within the next period of time, between $t_1$ and $t_2$, to the value of 0.

Figure 6:
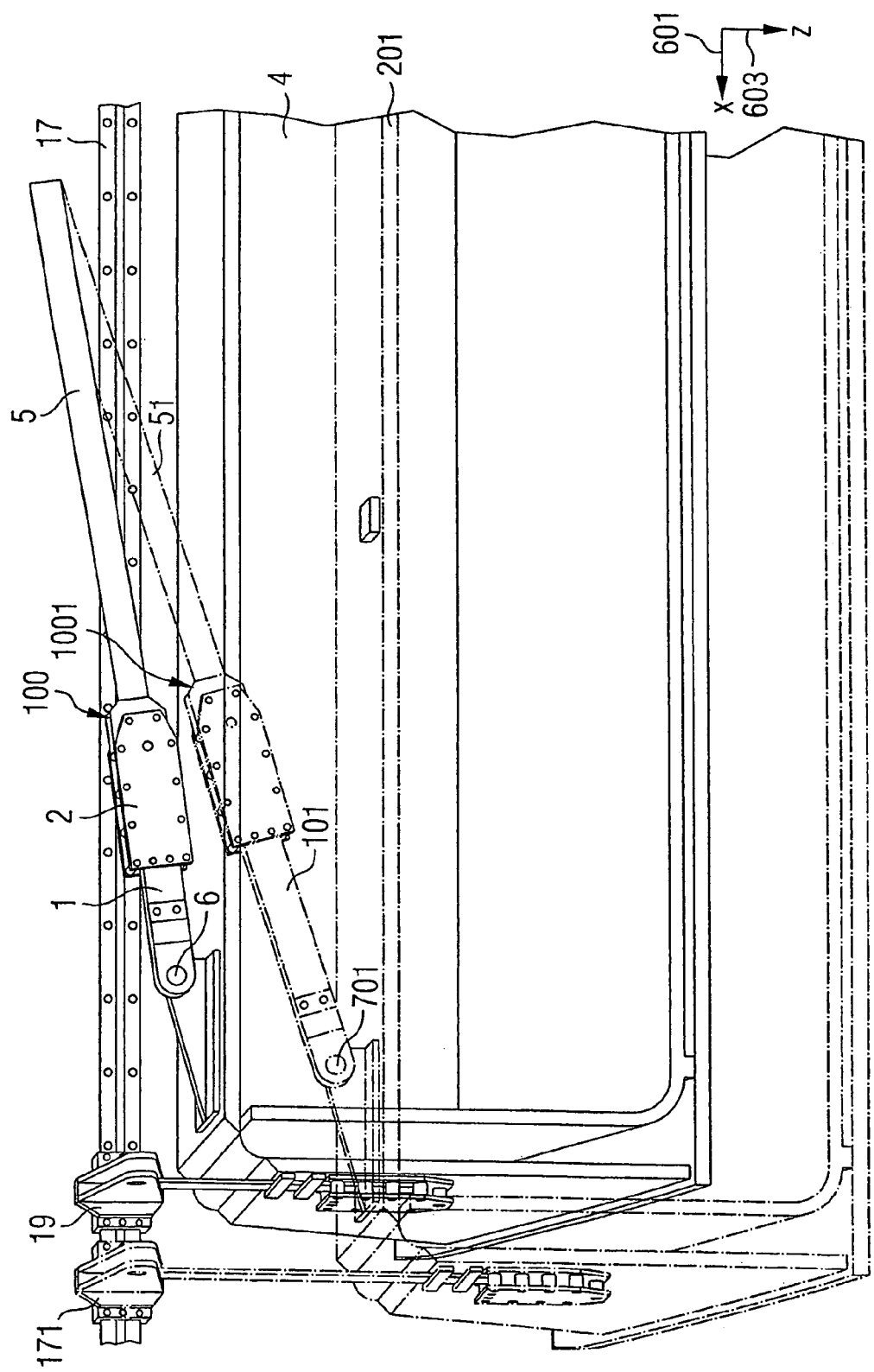
FIG. 6 shows a perspective partial view of the mounting system of FIG. 5 in the initial state and after partial extension of the mounting devices.

Curve 12 shows the gradient of acceleration of the primary structure of the aircraft, or rather of the linear guide attached to the primary structure (shown in FIG. 6). Since a mounting device according to the invention is connected between the primary structure and the interior equipment, the force impulse is not transmitted one to one to the interior equipment. Instead, absorption takes place in that acceleration energy is absorbed in the mounting device. This is indicated by curve 13.

Curve 13 shows the gradient of acceleration at the interior equipment. After acceleration has exceeded a corresponding threshold value of $a_2$ (shown by the dashed line 400), the absorbing function of the energy absorber commences. In this process the energy absorber is pulled out of the housing. The force required for this results in absorption of the acceleration energy, which means that the acceleration peak 14 of curve 12 is not directly transmitted to the interior equipment. Instead, a widening of the acceleration curve by displacing the peak 14 to the flank 15 takes place. The area underneath the curves 12 and 13 remains, which is indicated in the diagram by the arrow 16. The area underneath the curves 12, 13 represents the (mass-standardised) impulse or rather the speed of the primary structure (i.e. the aircraft per se) and the interior equipment. Of course, on completion of the force impulse and on completion of energy absorption, both speeds are constant; a situation which is expressed by the same area below the curves 12, 13.

Acceleration can also first act in positive direction (in relation to axis 11) and subsequently in negative direction. The period of time of acceleration can be less than 0.1 seconds and can reach peaks of plus minus 40 g. It should be noted that these are merely exemplary values. Of course, accelerations and durations of thrust can also have quite different values. For example, acceleration can in fact also be considerably smaller, or the period of time during which acceleration acts can be longer than 0.1 seconds.

The acceleration peaks of the primary structure can be at least partly compensated for or absorbed by the mounting device according to the invention. In this way, any ripping out or ripping off of the interior equipment from the primary structure is effectively prevented.

In this process the mounting according to the invention absorbs energy in both (positive and negative) directions. The energy absorber is first pulled out of the cage 2 and then pushed back into the cage 2 (rebound effect), before perhaps again being pulled out of this position.

Figure 4:
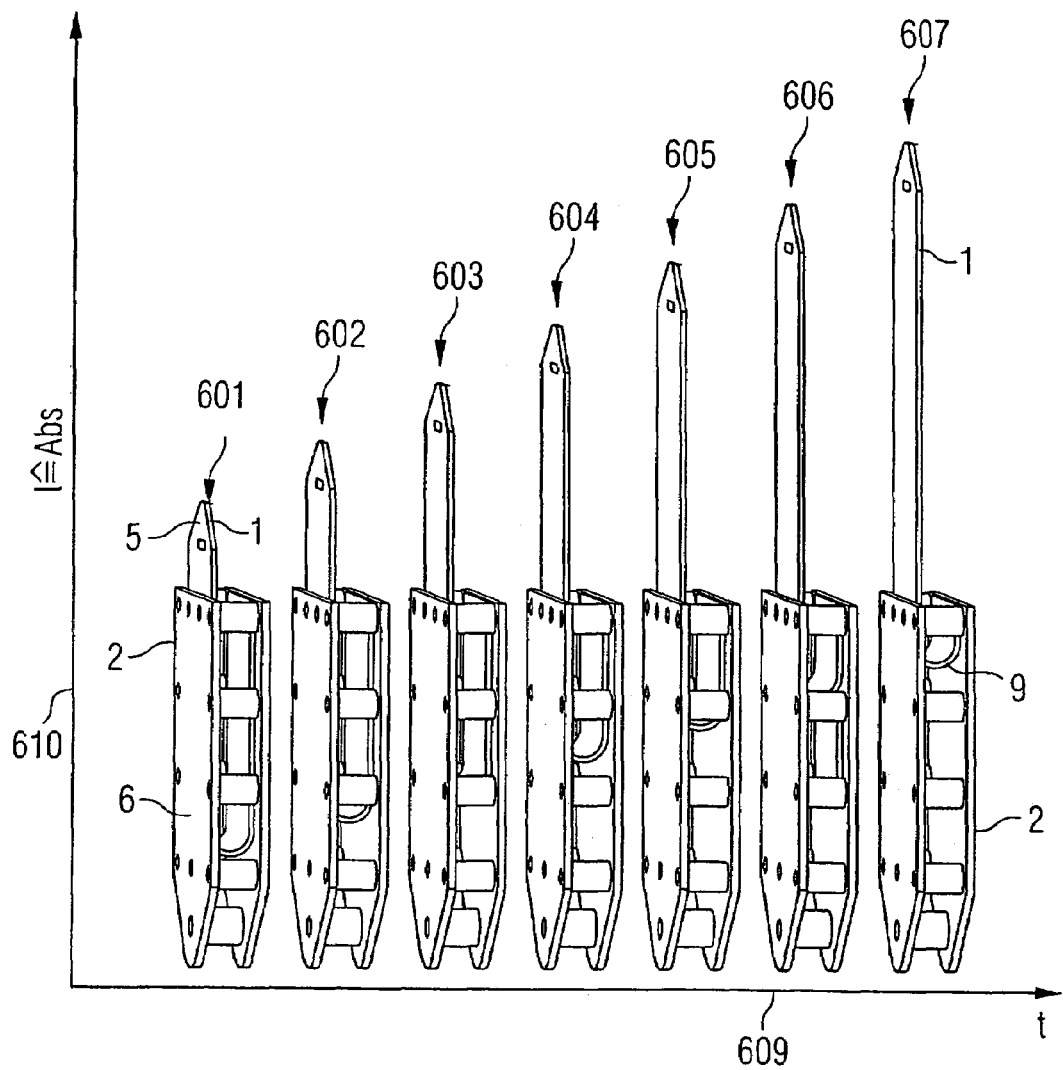
FIG. 4 shows a perspective view of a mounting device according to the invention, in various phases of energy absorption.

FIG. 4 shows a mounting device according to one embodiment of the present invention, in seven different phases. The horizontal axis 609 represents progress over time, while the vertical axis 610 represents the length by which the energy absorber 1 is extended from the housing 2. The length of extension is a measure of the energy absorbed in the mounting device. Reference sign 601 refers to the mounting device in its initial state. The fastening region 6, in which the housing 2 of the mounting device is fastened to the interior equipment (not shown in FIG. 4), is clearly shown. Also shown is the fastening region 5, which is located on the energy absorber 1. In this region 5 the energy absorber 1 is connected to the primary structure (not shown in FIG. 4).

Figure 5:
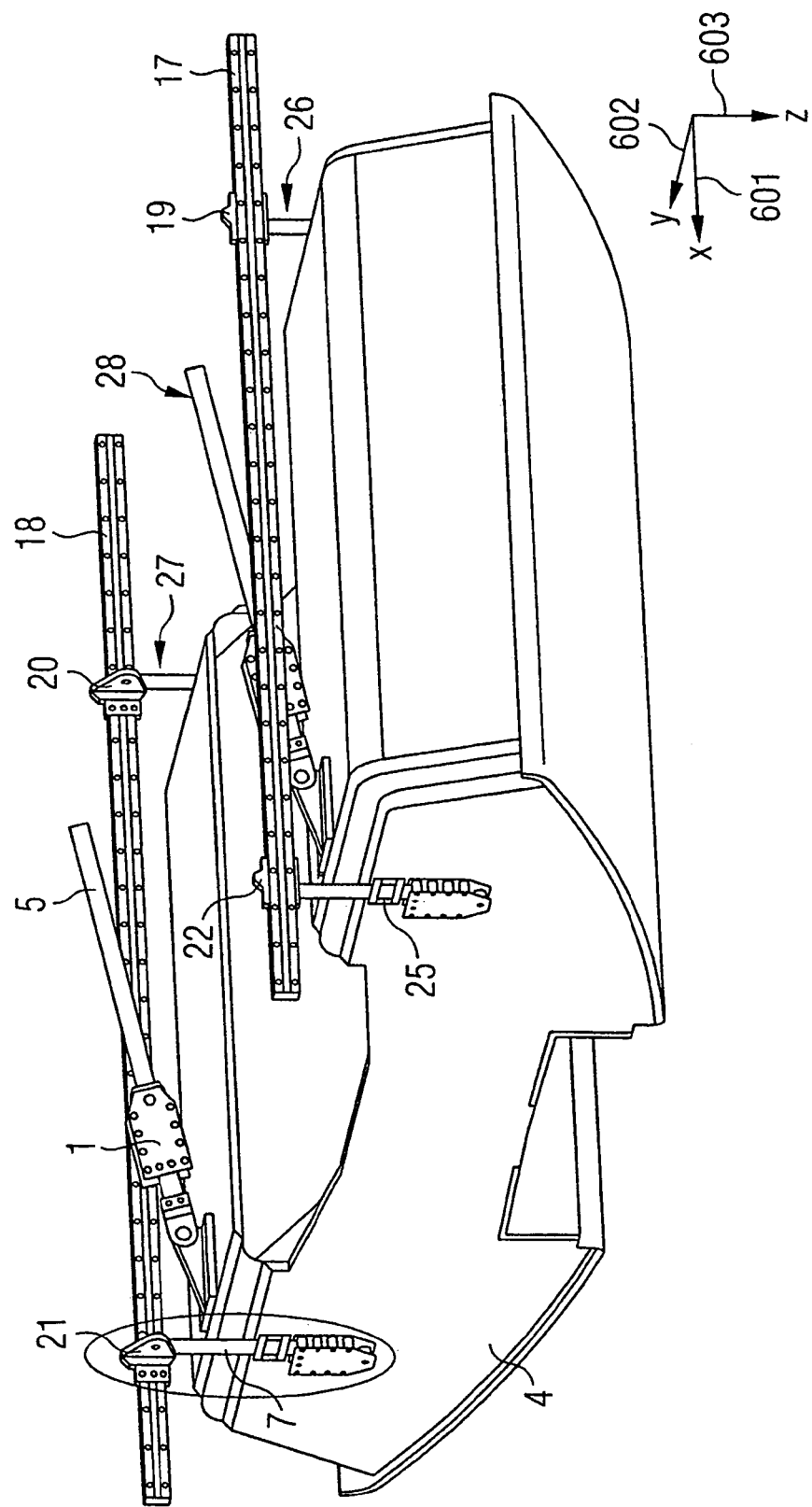
FIG. 5 shows a perspective view of a mounting system with several mounting devices according to an embodiment of the present invention.

Reference characters 602 to 606 refer to various phases of energy absorption by the mounting device. In all phases there is a secure connection between the interior and the primary structure. The mounting device 607 is shown in an extreme situation. In this arrangement the energy absorber 1 is completely pulled out of the housing 2. The length of extension and the energy absorbed thereby are at their maximum (and there is still a secure connection between the interior and the primary structure). Furthermore, FIG. 5 shows how the region of deformation 9 of the energy absorber shifts further and further upward. This requires corresponding deformation energy which leads to the energy absorption according to the invention.

FIG. 5 shows a perspective view of a mounting system with several mounting devices according to an embodiment of the present invention. The mounting system shown in FIG. 5 essentially consists of two guide rails or linear guides 17, 18 and six mounting devices or energy absorbers 1, 7, 25, 26, 27, 28. In this arrangement, energy absorbers or mounting devices 1, 28 have a direction of energy absorption with a component parallel to the guide direction of the linear guides 17, 18. In the case of a corresponding force impulse, which occurs along the X-axis 601, the resulting energy can be absorbed by way of the mounting devices or energy absorbers 1, 28. This results in a movement of the interior equipment 4 relative to the guide rails 17, 18 in the direction of the X-axis 601. The guide rails 17, 18 are securely connected to the primary structure of the aircraft.

Furthermore, by way of the mounting devices or energy absorbers 7, 25, 26, 27 and the corresponding bearings 19, 20, 21, 22, the interior equipment 4 is slidingly connected to the guide rails 18, 17 so that the interior equipment is movable along the guide rails 17, 18. In this arrangement a force impulse in the Z-direction 603 can be evened out or absorbed by way of the mounting devices 7, 25, 26, 27.

The interior equipment 4, which for example is a central compartment which is arranged overhead the passengers in the middle of the passenger compartment, is connected to the primary structure by way of the linear guides 17, 18. Thus, in the case of a forward or reverse impulse the position of the overhead bin 4 can shift in the X-direction 601.

For example, the linear guide can also be integrated in the hat rack, and the mounting device/energy absorber can be fixed to the primary structure.

FIG. 6 shows a perspective partial view of the mounting system of FIG. 5 in its initial state and after partial extension of the mounting devices. In this arrangement he mounting device 100 is firmly connected to the primary structure of the aircraft (not shown in FIG. 6) by way of the first fastening region 5. Furthermore, the mounting device 100 is connected to the interior equipment 4 by way of the second fastening region 6 of the energy absorber 1.

If a force impulse occurs that has a component in the X-direction 601, the energy absorber 1 is at least partly pulled out of the housing 2 of the mounting device 100. This is shown by the mounting device 1001, fastening region 51, energy absorber 101 and fastening region 701, shown superimposed in the drawing. Furthermore, as shown in FIG. 6, the bearing 19 is displaced along the linear guide 17, as shown by reference sign 171. Likewise, the entire compartment 201 is displaced in relation to its original position 4.

Advantageously the energy absorber 1 is designed in the manner of a block and tackle so that the length of the housing 2 is only approximately half the extension length.

As shown in FIG. 6, the mounting system functions in several directions. For example, energy can be absorbed both during extension from the housing and during retraction; this is necessary in particular in the case of a so-called rebound, which is a springing back of the overhead bin. Furthermore, the mounting system is designed for multiple crash impulses including rebounds. That is, that during the actual crash impulse the sheet metal strip is pulled out, while during the rebound the sheet metal strip is pulled in. After this, the sheet metal strip can be pulled out repeatedly, with energy absorption starting anew.

Under operating conditions (i.e. for example under normal flight conditions in which turbulence can also occur) the mounting system functions conventionally, namely rigidly. Only when a defined load level is exceeded, which can for example occur during a crash or an emergency landing, does extension of the energy absorber 1 from the housing 2, and thus energy absorption, occur.

In this way an effective mounting concept is provided, which limits the force acting on interior equipments irrespective of the magnitude of the crash impulse. This results in particular in improved safety without any increase in the weight of the overall system comprising mountings and overhead bins. Furthermore, the mounting according to the invention can also be applied to overhead bins in other means of transport, for example ferries, buses or rail vehicles. Advantageously, by integrating the energy absorbers in the mounting, the design of the cabin that is customary at present is maintained, even with the use of energy absorbers. No changes in the design of the interior equipments are required.

Of course, it is also possible to use other energy absorption elements, such as for example metal foams that are compressed, or fibre reinforced materials that are used as so-called crash tubes.

Implementation of the invention is not limited to the preferred embodiment shown in the figure. Instead, a multitude of designs are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference signs in the claims are not to be interpreted as limitations.

The invention claimed is:

1. A mounting system for interior equipment in an aircraft, comprising:
   a first mounting device, comprising:
   a first energy absorber;
   a first housing;
   wherein the mounting device is mounted between a primary structure of the aircraft and the interior equipment;
   wherein the first energy absorber is at least partly arranged in the first housing;
   wherein the first energy absorber is adapted for being pushed into the first housing or pulled out of the first housing thus being deformed inside the first housing and absorbing multiple impulses in opposite directions;
   wherein the mounting system further comprises:
   a linear guide;
   a bearing;
   wherein the first mounting device has a first direction of energy absorption;
   wherein the linear guide has a guide direction;
   wherein the guide direction has a component which is parallel to the energy absorption direction of the first mounting device; and
   wherein the bearing fixes the interior equipment to the linear guide such that the interior equipment can slide along the linear guide.

2. The mounting system of claim 1, further comprising:
   a second mounting device comprising:
   a second energy absorber;
   a second housing;
   wherein the second mounting device is mounted between a primary structure of the aircraft and the interior equipment;
   wherein the second energy absorber is at least partly arranged in the second housing;
   wherein the second energy absorber is adapted for being pushed into the second housing or pulled out of the second housing thus being deformed inside the second housing and absorbing multiple impulses in opposite directions;
   wherein the second mounting device has a second energy absorption direction; and
   wherein the guide direction has a component which is perpendicular to the second energy absorption direction; and
   wherein the first fastening region of the second mounting device is fastened to the bearing.

3. The mounting system of claim 1, wherein the mounting system is mounted in an aircraft.

* * * * *